US007210915B2

(12) United States Patent
Minakawa et al.

(10) Patent No.: US 7,210,915 B2
(45) Date of Patent: May 1, 2007

(54) POWDER COMPACTING APPARATUS

(75) Inventors: Susumu Minakawa, Tokai-mura (JP); Takashi Iwasaki, Takarazuka (JP); Akira Iwai, Amagasaki (JP); Kouji Nounen, Settu (JP); Morihiro Sato, Shibata-machi (JP)

(73) Assignees: Japan Nuclear Cycle Development Institute, Ibaraki (JP); Kimura Chemical Plants Co., Ltd., Amagasaki-shi, Hyogo (JP); Japan Computer Engineering Co., Ltd., Miyagi (JP)

( * ) Notice: Subject to any disclaimer, the term of this patent is extended or adjusted under 35 U.S.C. 154(b) by 384 days.

(21) Appl. No.: 10/960,506

(22) Filed: Oct. 8, 2004

(65) Prior Publication Data

US 2005/0214396 A1 Sep. 29, 2005

(30) Foreign Application Priority Data

Mar. 25, 2004 (JP) ............................ 2004-088962

(51) Int. Cl.
*B29C 43/32* (2006.01)
*B29C 43/42* (2006.01)

(52) U.S. Cl. ........................ 425/78; 425/186; 425/195; 425/354

(58) Field of Classification Search .................. 425/78, 425/186, 193, 195, 352–356, 406, 411
See application file for complete search history.

(56) References Cited

U.S. PATENT DOCUMENTS 4,362,491 A * 12/1982 Livingstone ................ 425/193
5,049,054 A * 9/1991 Schaidl et al. ................ 425/78

* cited by examiner

*Primary Examiner*—Yogendra Gupta
*Assistant Examiner*—Thu Khanh T. Nguyen
(74) *Attorney, Agent, or Firm*—Antonelli, Terry, Stout & Kraus, LLP.

(57) ABSTRACT

A powder compacting apparatus (1) has a top plate (3), a die plate (9) and a bottom plate (12), combined with each other as follows. The top plate (3) holds upper punches (4) in place by punch holders (5), and the die plate (9) firmly grips a die holder (8) holding dies (7). The bottom plate (12) keeps lower punches (11) in place gripped by clamps (32) so that an amount of powder fed into each die (7) is compacted to give a consolidated powder piece. The die plate (9) is composed of an upper part (9*a*) and a lower part (9*b*) so that the die holder (8) is sandwiched by and between the parts (9*a*, 9*b*), in such a manner that these parts cooperate with each other to secure each die (7) in position.

8 Claims, 7 Drawing Sheets

POWDER COMPACTING APPARATUS

FIELD OF THE INVENTION

The present invention relates to a powder compacting apparatus for use to produce consolidated pieces of a powder.

BACKGROUND OF THE INVENTION

In general, powder compacting apparatuses are used for instance in the conventional metallurgy industries in which a basic iron powder is blended with a copper powder, a graphite powder or the like alloy element to prepare a composition. Usually added to this composition is a lubricant such as zinc stearate, lead stearate or the like, to provide a mixed powder that will then be compacted in a press mold. Powder metallurgy is a process for producing for example such an iron-based compacted powder pieces, and in the atomic power industries the mold is disposed in a glove box so as to produce such pieces as nuclear fuel pellets.

Presses widely used in this field comprise each two or more punches for a mold.

One of the prior art powder compacting apparatuses is disclosed in the Japan Patent Laying-Open Gazette No. H.9-253896 and shown in “FIG. 1” thereof (—FIG. 7—herein). This apparatus comprises a punch holder for attaching an upper punch to a top plate, a die plate for holding a die, and a bottom plate to which a lower punch is secured. The upper and lower punches are strongly urged towards each other to compress a powder mixture and compact it into a consolidated piece.

Now, FIG. 7 will be referred to in detail for description of the prior art type of powder compacting apparatuses.

This prior art proposes a die device for incorporation into a powder compacting apparatus. The die device comprises an upper punch 113 held in place by an upper holder 112, that is bolted to the lower face of a top plate 110. A die 121 fitted downwards in a die plate 123 is fixed therein by a die retainer 122 bolted thereto. A die plate supporter 126 is disposed below and adjacent to the lower face of die plate 123. A pair of guide posts 114 depend from opposite side ends of the top plate 110. These posts are loosely extend through corresponding holes formed in the die plate 123. Beatings secured in the supporter 126 hold the lower end portions of such guide posts 114 in a freely rotating engagement with said supporter. The die 121 has a central bore fitting on the top end of a lower punch 131, that can reciprocate up and down relative to this die 121. A lower holder 132 is bolted to a base plate 140 so as to retain thereon the lower punch 131. A pair of upright guide rods 160 penetrate the opposite side regions of said base plate 140.

In operation, an amount of powder will be placed in the die 121, and then the top plate 110 will be lowered along the guide posts 114 so that the upper punch 113 descends towards the die 121. On the other hand, the base plate 140 will be raised along the guide rods 160, thus driving the lower punch 131 upwardly towards the die 121. Those upper and lower punches 113 and 131 cooperate with each other to press the powder between them, thereby compacting it into a consolidated piece.

When setting this apparatus ready to operate, the upper end of lower punch 131 will be positioned at first to fit in the die 121. This die will then engage the die plate 123, before the retainer 122 is placed onto the die and bolted downwards to this die plate. The lower holder 132 restraining the lower punch 131 from sideways movement will be bolted downwards to the base plate 140 so as to fix thereon the lower punch. Subsequently, the lower end of upper punch 113 will be fitted in die 121, before temporarily lowering the top plate 110. Next, the upper holder 112 will be positioned correct relative to this plate by upwardly screwing some bolts. As the final step, the top plate 110 will be retracted upwards in order to tightly fasten those bolts for firmly fixing the upper punch 113.

In the powder compacting apparatus summarized above, many bolts are used around the die 121 in order that the retainer 122 urges downwards this die within the die plate 123. Thus, very intricate and time-consuming works are necessary when mounting and dismounting the die 121.

As also noted above, the upper punch 113 has to preliminarily fit in the die 121 to be aligned therewith. Thus, many further bolts inserted upwards through the upper holder 112 will be allowed to loosely engage with the top plate 110. Subsequently, the top plate will be lifted to tightly fasten the bolts and firmly secure the upper punch 113 in position. Due to almost impossible visual inspection of the positions of those bolts and bolt holes receiving them, the upper holder 112 is not easy to fix. All the works to bolt this holder 112 may alternatively be done after having raised the top plate 110. In this case, it will however be more difficult to precisely align the upper punch 113 with the die 121, also failing to smoothly attach and quickly fasten those bolts.

The upper punch 113 should be protected from damage when it is driven into a smooth alignment with the die 121. For this purpose, a manually operable mold changer may be necessary for slowly raising and lowering the upper punch. Such a mold changer will be located apart from the main body of a powder compacting apparatus. Therefore, a set of dies and relevant members therefor must move fore and aft between such a changer and the apparatus.

SUMMARY OF THE INVENTION

A powder compacting apparatus (1) provided herein in view of such problems noted above will comprise a top plate (3), a die plate (9) and a bottom plate (12), combined with each other as follows. The top plate (3) holds upper punches (4) in place by means of punch holders (5), and the die plate (9) firmly grips a die holder (8) holding dies (7) therein. The bottom plate (12) keeps lower punches (11) in place by means of clamps (32) for gripping the punches. An amount of powder fed into each die (7) will thus be compacted therein to give a consolidated powder piece. Characteristically, the die plate (9) is composed of an upper part (9*a*) and a lower part (9*b*). The die holder (8) is sandwiched by and between the parts (9*a*, 9*b*), in such a manner that these parts cooperate with each other to secure each die (7) in position.

Also characteristically, an upper retentive plate (6) is disposed below and attached to the top plate (3) so that the punch holders (5) are firmly fitted in and through this retentive plate (6). Further, an internal sleeve (13) is disposed around each upper punch (4) held in the corresponding punch holder (5). In operation, the internal sleeve (13) will be inflated uniformly so as to press and strongly grip each upper punch (4) in the holder (5), in a centripetal manner. Furthermore, a lower retentive plate (10) fixed on the bottom plate (12) does comprise the clamps (32) and locking bolts (33) cooperating with them. These bolts (33) are capable of being fastened such that the clamps (32) will slide on and along the body of retentive plate (10). In operation, each lower punch (11) will immovably be pressed against the body of this plate (10).

The mounting and dismounting of dies in the present apparatus are much easier and much quicker than in the prior art apparatuses, thus saving labor time. Particularly, the upper punches can be aligned with the dies more smoothly in situ, without moving a set of the dies and relevant members to or away from any mold changer.

THE PREFERRED EMBODIMENTS

Figure 1:
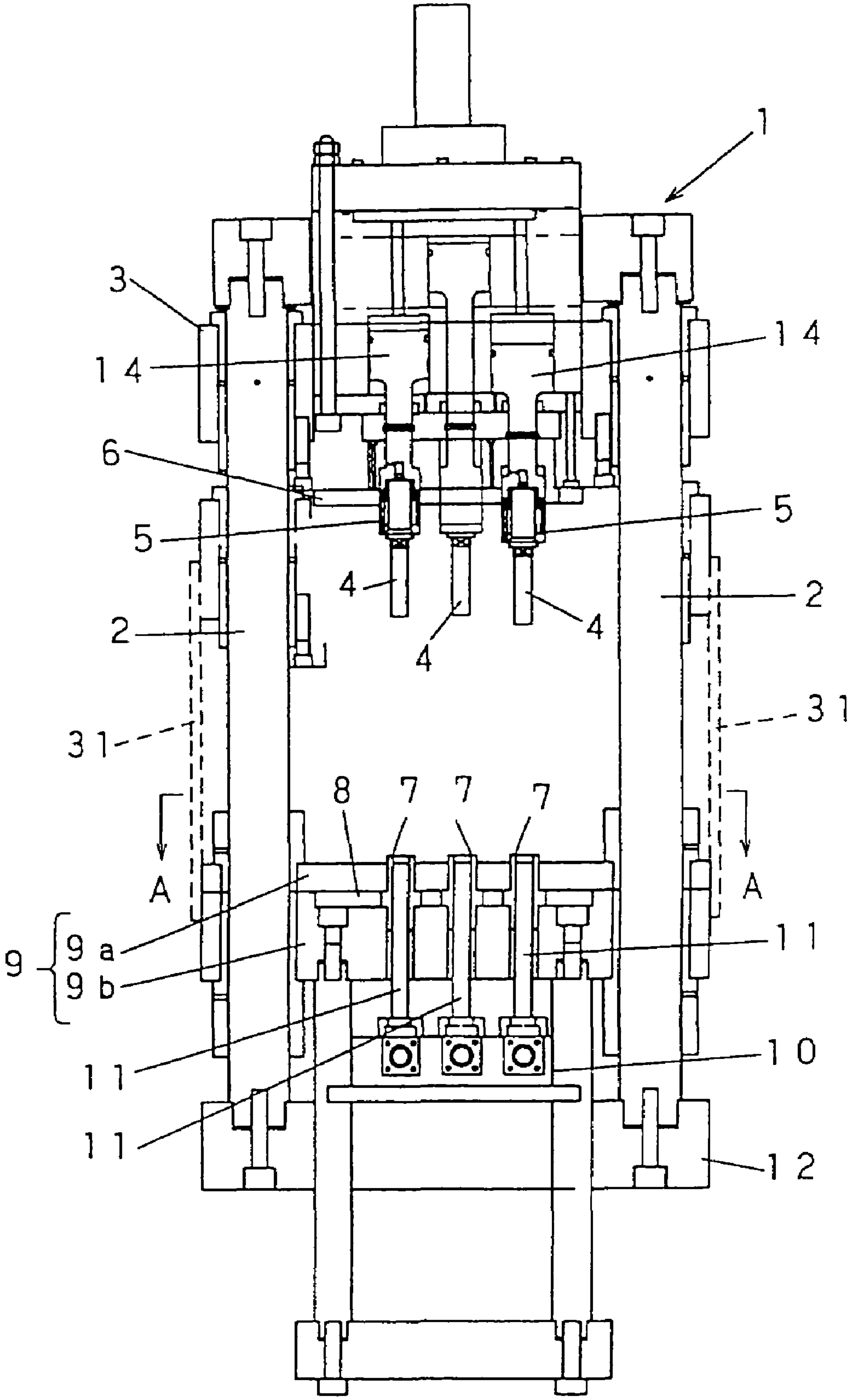
FIG. 1 is a front elevation of a powder compacting apparatus provided in an embodiment of the present invention.
Figure 2:
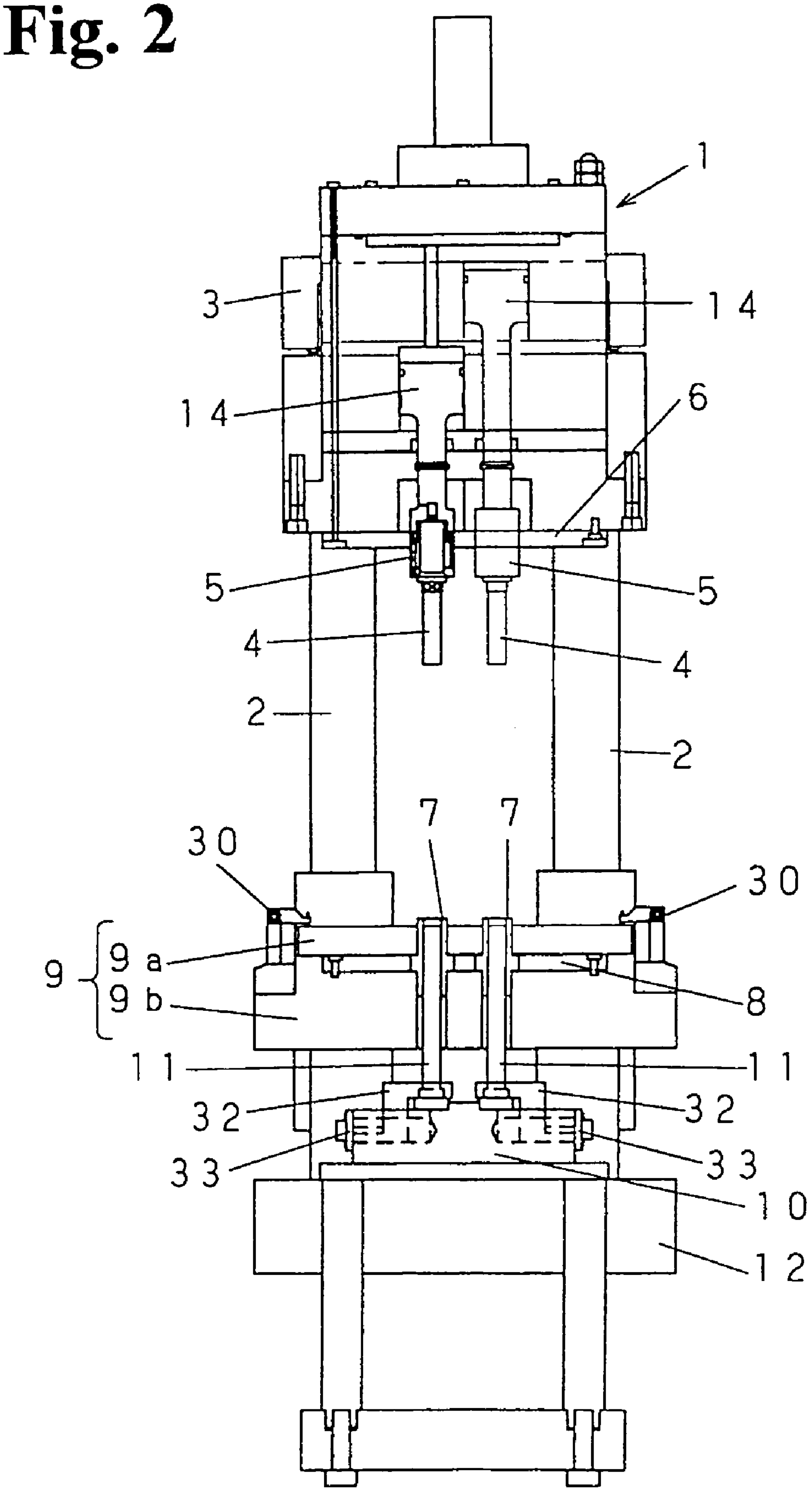
FIG. 2 is a side elevation of the apparatus shown in FIG. 1.

As shown in FIGS. 1 and 2, a powder compacting apparatus 1 of the present invention comprises a top plate 3, and upper punches 4 held by punch holders 5. These plate 3 and holders 5 are to be driven up and down along guide shaft 2. An upper retentive plate 6 serves to fix the punch holders 5 on the top plate 3. The apparatus further comprises dies 7 that extend vertically and centrally of a die holder 8, which in turn is locked in position by a die plate 9. In other words, such a holder 8 and die plate 9 do function to fixedly secure the dies 7. The apparatus still further comprises a bottom plate 12 that supports thereon a lower retentive plate 10 so as to hold lower punches 11 in position.

Figure 3:
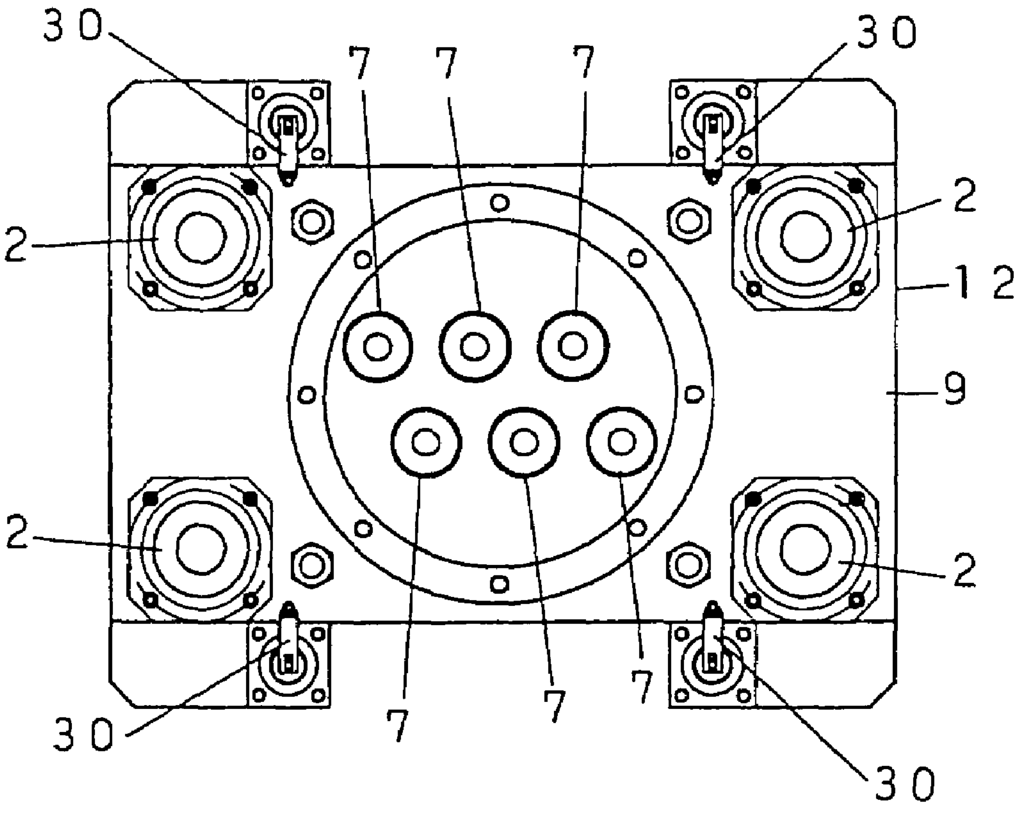
FIG. 3 is a cross section taken along the line A—A in FIG. 1.

The guide shafts 2 are arranged at four corner regions of the die plate, surrounding 6 (six) dies 7 as seen in FIG. 3.

An oil-hydraulic or electric motor (not shown) will drive the top plate 3 to move up and down along the guide shafts 2 holding this plate. The top plate 3 in turn retains the punch holders 5 and pistons 14, and the number of these pistons is the same as that of dies 7.

Figure 4:
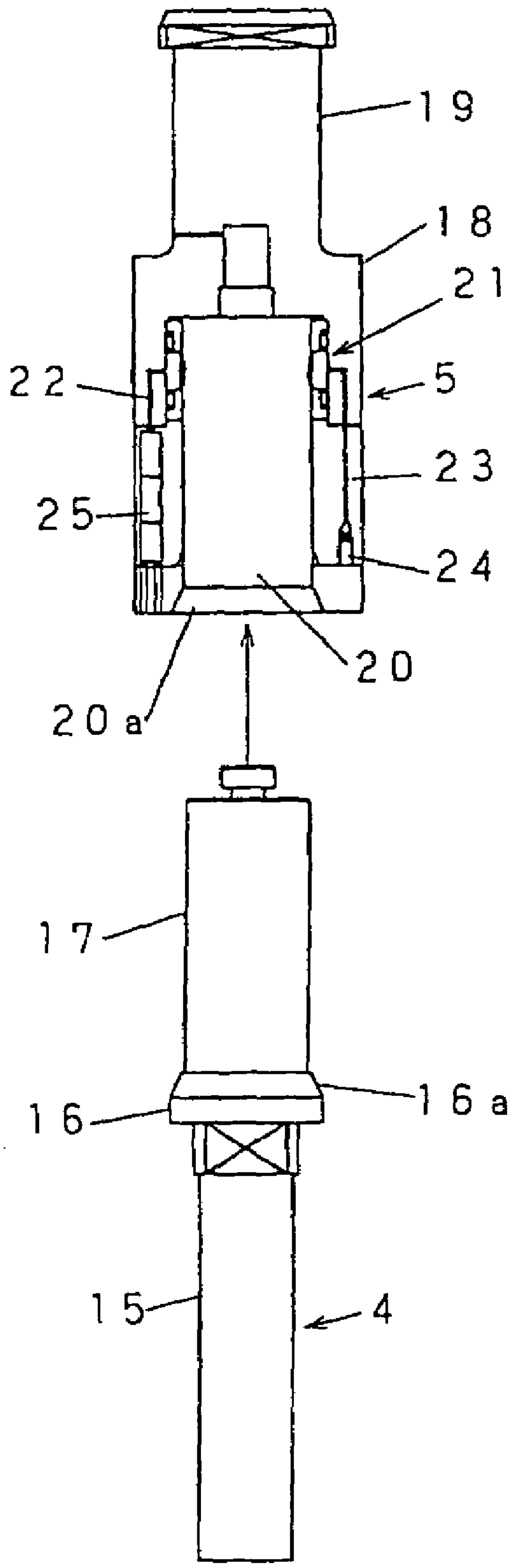
FIG. 4 is a front elevation of an upper punch being fixed in position in the apparatus.
Figure 5:
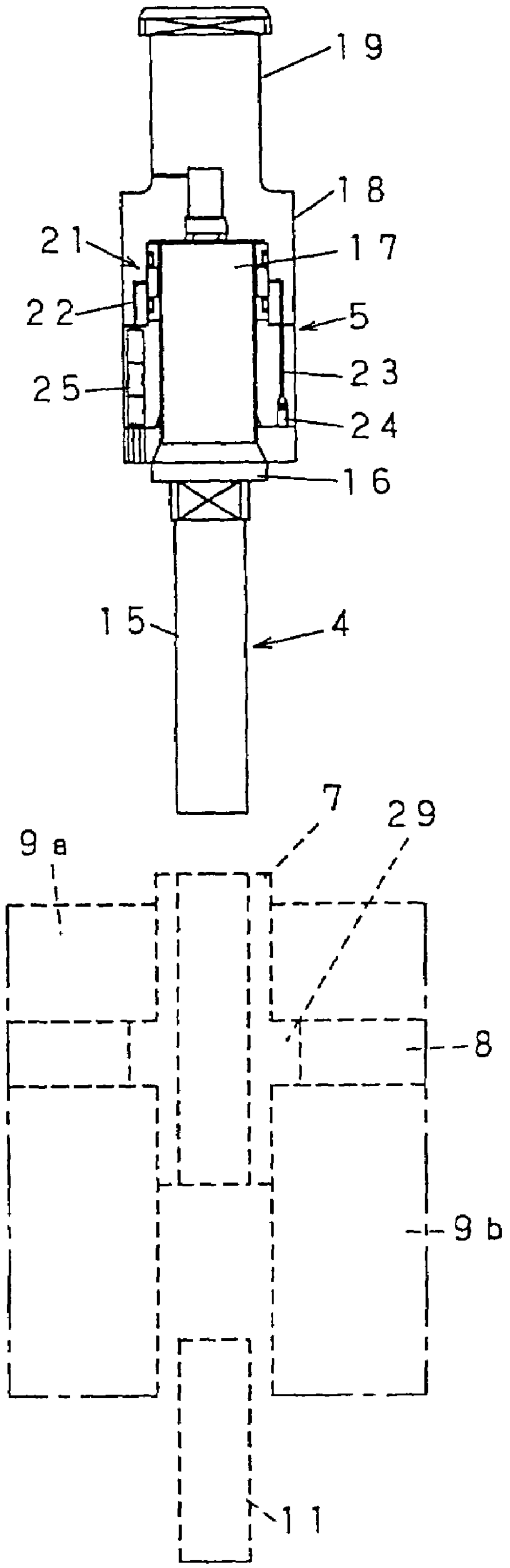
FIG. 5 is a front elevation of the upper punch having been fixed in position.

Each upper punch 4 is an integral piece comprising a press portion 15 to be forced into the die 7. As shown in FIG. 4, the upper punch 4 farther comprises an annular shoulder 16 and an insert portion 17, continuing upwards in this order from the press portion 15. The shoulder 16 of an enlarged diameter will bear against the lower end of punch holder 5. The insert portion 17 will be received in the punch holder 5 so that its periphery is firmly seized therein. A tapered region **16*a* is formed as a portion of the shoulder 16** continuing to the insert region of a smaller diameter.

As also seen in FIG. 4, the punch holder 5 is constructed to firmly hold therein the insert portion 17 of upper punch 4. Thus, the punch holder 5 comprises a lower cylindrical body 18 continuing upwards to a support head 19 made integral therewith. A cylindrical cavity or bore 20 is formed centrally and upwards from a lower tapered end **20*a* of the body 18, so that the insert portion 17 can be received in this cavity. The upper end region of the periphery of this cavity 20 is formed as a squeezing section 21, as will be detailed below. A tip end of the head 19 of each punch holder 5 is supported by the lower face of piston 14 that is held in the top plate 3**.

Figure 6:
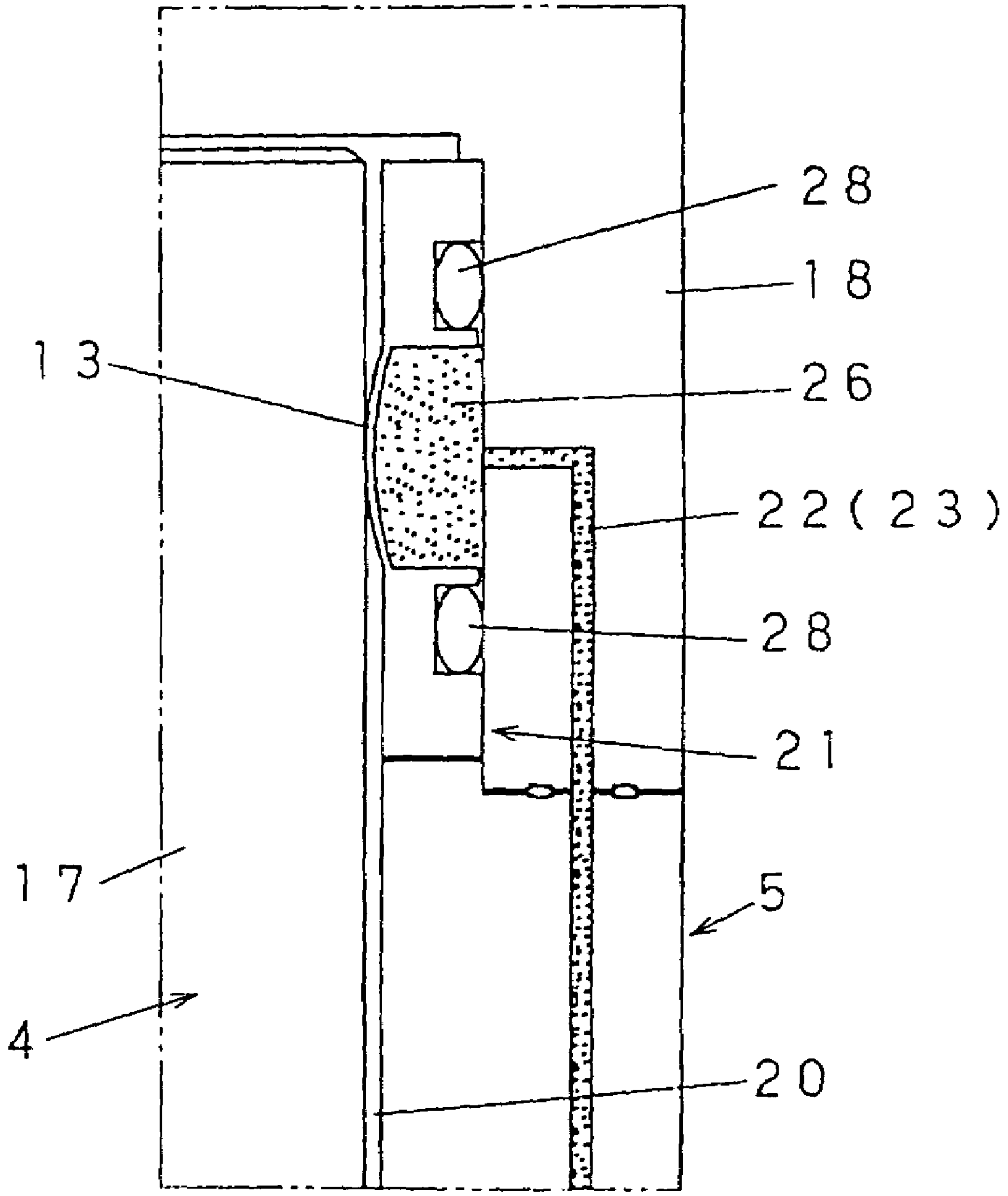
FIG. 6 is an enlarged cross section of a portion of the punch fixed in position.

Formed between the cavity 20 and the outer peripheral surface of cylindrical body 18 of punch holder is the squeezing section 21 as shown in FIGS. 4 and 6. This section 21 comprises a compressed-oil chamber 26 in fluid communication with an oil-feed passage 22 and oil discharge passage 23. These passages extend from the lower end of said body 18, and an airtight stopper 24 serving also as an air-breaker is closely fitted in the lower end of said discharge passage 23. In addition, a screw-type hydraulic element 25 is installed in the lower end region of the oil-feed passage 22 so that hydraulic pressure in the chamber 26 can be raised by operating this screw.

FIG. 6 illustrates in detail the squeezing section 21 that is an annular space formed around the cavity 20 of each punch holder 5. The internal sleeve 13 will be brought into a close contact with the insert portion 17 of upper punch 4 fitted in the cavity 20, to thereby fix this portion at its normal position. The reference numeral 28 denotes seal rings. A tip end of the insert portion 17 will be pressed towards the head 19 of punch holder 5, and then rotated a little angle so as to protect the punch 4 from falling out of the cavity 20.

The upper retentive plate 6 bolted up to the top plate 3 has apertures each receiving the lower cylindrical body 18 of each punch holder 5. The number of such apertures is the same as that of the dies. Each piston 14 seizes the upper end of each holder 5, preventing it from slipping off. If the upper retentive plate 6 has preliminarily been aligned with the die holder 8, then clearance adjustment between it and the dies 7 will not be necessary. Also, the tapered regions **16*a* of each upper punch 4 need not be aligned with a tapered inlet 20*a* of the corresponding punch holder 5. Further, any adjustment in position of the upper punch 4 will not be necessary relative to the internal sleeve 13** fitting thereon.

Figure 7:
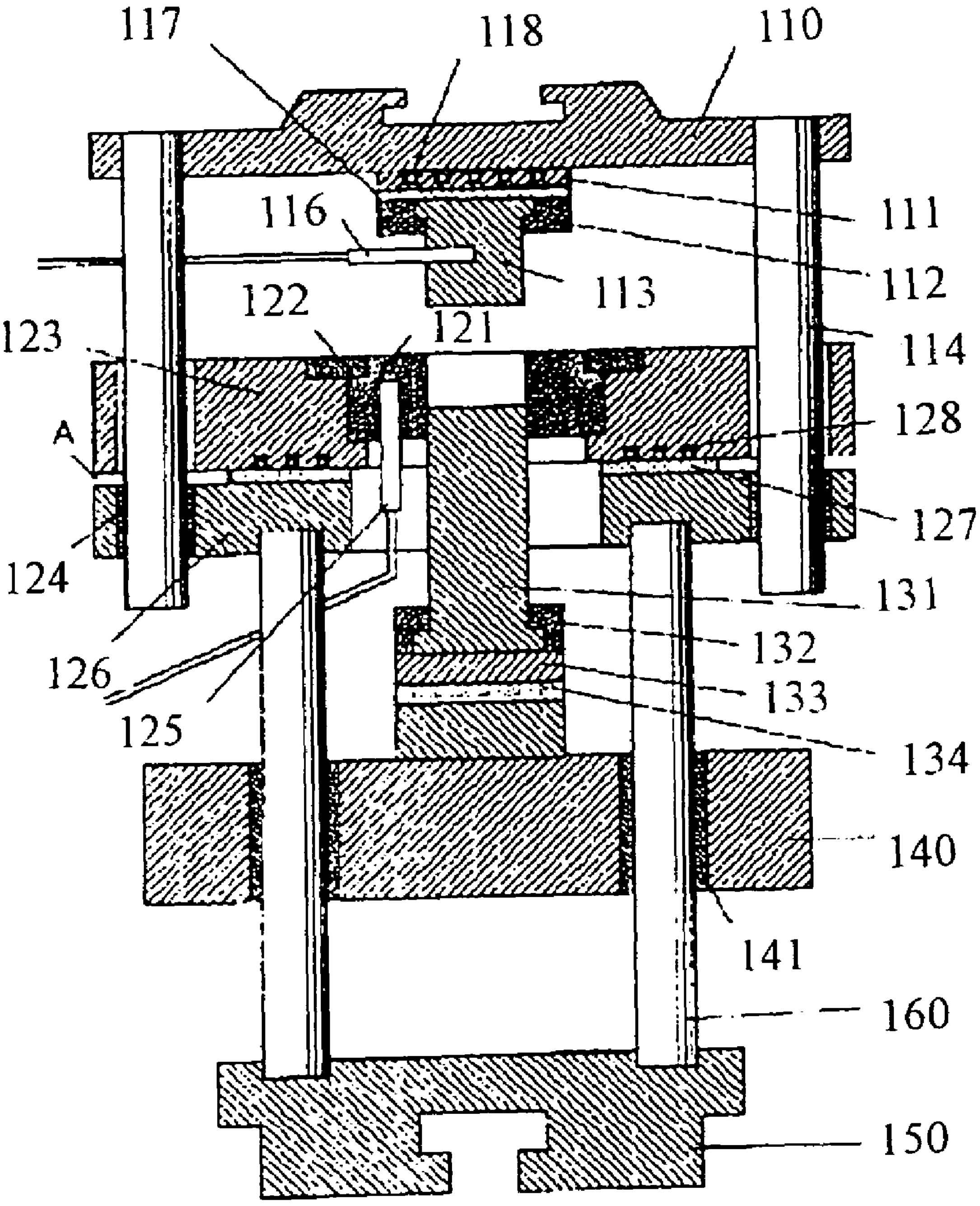
Fig. 7 Prior Art
FIG. 7 is a vertical cross section of the prior art apparatus.

Each die 7 is, as seen in FIGS. 1 and 7, a hollow cylindrical piece shown at its upright position in the drawings. A flange 29 integrally protrudes outwards and radially from a middle height of the outer periphery of each die 7.

The die holder 8 has apertures formed therein to receive the flanges 29 of dies, the number thereof being the same as that of the dies 7.

The die plate 9 discussed above is split into an upper part **9*a* and a lower part 9*b*, both being guide by the shafts 2 so as to be movable relative to each other. Each part 9*a* and 9*b* has apertures for receiving cylindrical portions of each die 7**, the number of such apertures also being the same as that of the dies.

Thus, the lower cylindrical portions of dies 7 fit in the respective apertures of the lower part **9*b* of die plate. Next, the die holder 8 will be laid on this lower part 9*b* so that the apertures of this holder 8 receive the respective flanges 29 of dies 7. Then, the upper part 9*a* of said die plate is put on the die holder 8, likewise receiving the upper cylindrical portions of dies 7. Hooks 30 having their bases attached to the lower part 9*b* will thereafter be actuated oil-hydraulically or pneumatically. By locking the upper part 9*a* in this way, the die holder 8 becomes sandwiched together with the dies 7 by and between those upper and lower parts 9*a* and 9*b***.

The bottom plate 12 is set on the ground by means of the guide shafts 2 disposed at each corner of this plate. The lower retentive plate 10 is bolted to the upper face of bottom plate 12.

The lower punches 11 held on this retentive plate 10 will be caused to upwardly fit in the respective dies 7 that have been temporarily lowered. Subsequently, clamps 32 will be operated to lock these lower punches 11 in position on said retentive plate 10.

It will be apparent from FIG. 2 that each clamp 32 has an outer lower portion loosely held in the lower retentive plate 10 so that the clamp can slide in and out. Each clamp 32 has an inner end with a cutout serving as a groove for engagement with the lower punch 11. A locking bolt 33 screwed inwards from the lateral wall of retentive plate 10 has an inner end bearing against the clamp 32.

The reference numeral 33 denotes connective plates each serving to connect the top plate 3 to the upper part 9*a* of die plate 9.

When bringing the lower punches 11 into operative connection with the respective dies 7, these dies will be fitted in the respective apertures of the lower part 9*b* of die plate. Next, the die holder 8 will be laid on this lower part 9*b* so that the apertures of this holder receive the respective flanges 29 of the dies. Then, the upper part 9*a* of said die plate is put on the die holder 8 so that they receive the upper cylindrical portions of dies 7. The hooks 30 connected to the lower part 9*b* will thereafter be actuated to lock the upper part 9*a* of die plate. Now, the dies 7 can be mounted on or dismounted from the apparatus, without using any further bolts other than those noted above. Such an operation that does not involve any intricate or complicated steps can be done more quickly as compared with the prior art apparatus. This feature is advantageous particularly to atomic energy industries in which glove boxes are used to conduct operations necessary to produce nuclear fuel pellets in the shape of compacted pieces of powder.

As will be seen in FIG. 2, the locking bolts 33 will be screwed inwards into the lower retentive plate 10 so that the clamps 32 engaging with the inner ends of said bolts are caused to slide on this plate 10. As a result, the lower end of each lower punch 11 is retained in the groove of each clamp 32 and strongly urged towards the retentive plate 10, not to fluctuate in position to any extent.

With the upper retentive plate 6 being bolted to the lower face of to plate 3, each punch holder 5 supported on the piston 14 in the top plate will be will surely be retained not to fall down as a whole or to rock at its inner end. In this state of the members, the top plate 3 can safely be lowered for the next operation.

As for each upper punch 4, its insert portion 17 will be placed in the corresponding punch holder and twisted for temporary attachment thereto. The punch 4 will then have its tapered region 16*a* caused to slide into an aligned engagement with the tapered region 20*a* of punch holder 5. Thereafter, the hydraulic element 25 will be operated to raise oil pressure in the compressed-oil chamber 26. This chamber will thus expand to inflate the internal sleeve 13 inwardly towards cylindrical cavity 20. As a result, this sleeve will come into a forced contact with the insert portion 17 of upper punch 4, thereby affording a strong and uniform fastening force each upper punch.

In this way, the dies 7 can now be aligned with the upper punches 4 easily and surely, and these punches can be locked in position in a shorter time. The setting of those dies can be done in situ, no longer transporting any die assembly to a foreign mold changer.

The embodiment described above is meant to be merely an example of the invention, and it may be modified within the spirit and scope thereof even in application to any industrial fields other then the atomic energy industries.

The invention claimed is:

1. A powder compacting apparatus comprising:

a top plate holding upper punches in place by means of punch holders, a die plate firmly gripping a die holder holding dies therein, a bottom plate keeping lower punches in place by means of clamps for gripping the punches so that an amount of powder fed into each die will be compacted therein to give a consolidated powder piece, and, the die plate being composed of an upper part and a lower part so that the die holder is sandwiched by and between the parts, in such a manner that these parts cooperate with each other to secure each die in position.

2. A powder compacting apparatus as defined in claim 1, further comprising an upper retentive plate disposed below and attached to the top plate so that the punch holders are firmly fitted in and through this retentive plate.

3. A powder compacting apparatus as defined in claim 2, further comprising an internal sleeve disposed around each upper punch held in the corresponding punch holder such that in operation the internal sleeve will be inflated uniformly so as to press and strongly grip each upper punch in the holder, in a centripetal manner.

4. A powder compacting apparatus as defined in claim 3, further comprising a lower retentive plate fixed on the bottom plate and comprising the clamps and locking bolts cooperating with them, wherein the locking bolts are capable of being fastened such that the clamps will slide on and along the body of retentive plate so that in operation each lower punch will immovably be pressed against the body of this plate.

5. A powder compacting apparatus as defined in claim 2, further comprising a lower retentive plate fixed on the bottom plate and comprising the clamps and locking bolts cooperating with them, wherein the locking bolts are capable of being fastened such that the clamps will slide on and along the body of retentive plate so that in operation each lower punch will immovably be pressed against the body of this plate.

6. A powder compacting apparatus as defined in claim 1, further comprising a lower retentive plate fixed on the bottom plate and comprising the clamps and locking bolts cooperating with them, wherein the locking bolts are capable of being fastened such that the clamps will slide on and along the body of retentive plate so that in operation each lower punch will immovably be pressed against the body of this plate.

7. A powder compacting apparatus as defined in claim 1, further comprising an internal sleeve disposed around each upper punch held in the corresponding punch holder such that in operation the internal sleeve will be inflated uniformly so as to press and strongly grip each upper punch in the holder, in a centripetal manner.

8. A powder compacting apparatus as defined in claim 7, further comprising a lower retentive plate fixed on the bottom plate and comprising the clamps and locking bolts cooperating with them, wherein the locking bolts are capable of being fastened such that the clamps will slide on and along the body of retentive plate so that in operation each lower punch will immovably be pressed against the body of this plate.

* * * * *